(No Model.) 4 Sheets—Sheet 1.
J. C. PEDEN.
SEED DRILL AND FERTILIZER DISTRIBUTER.
No. 413,866. Patented Oct. 29, 1889.
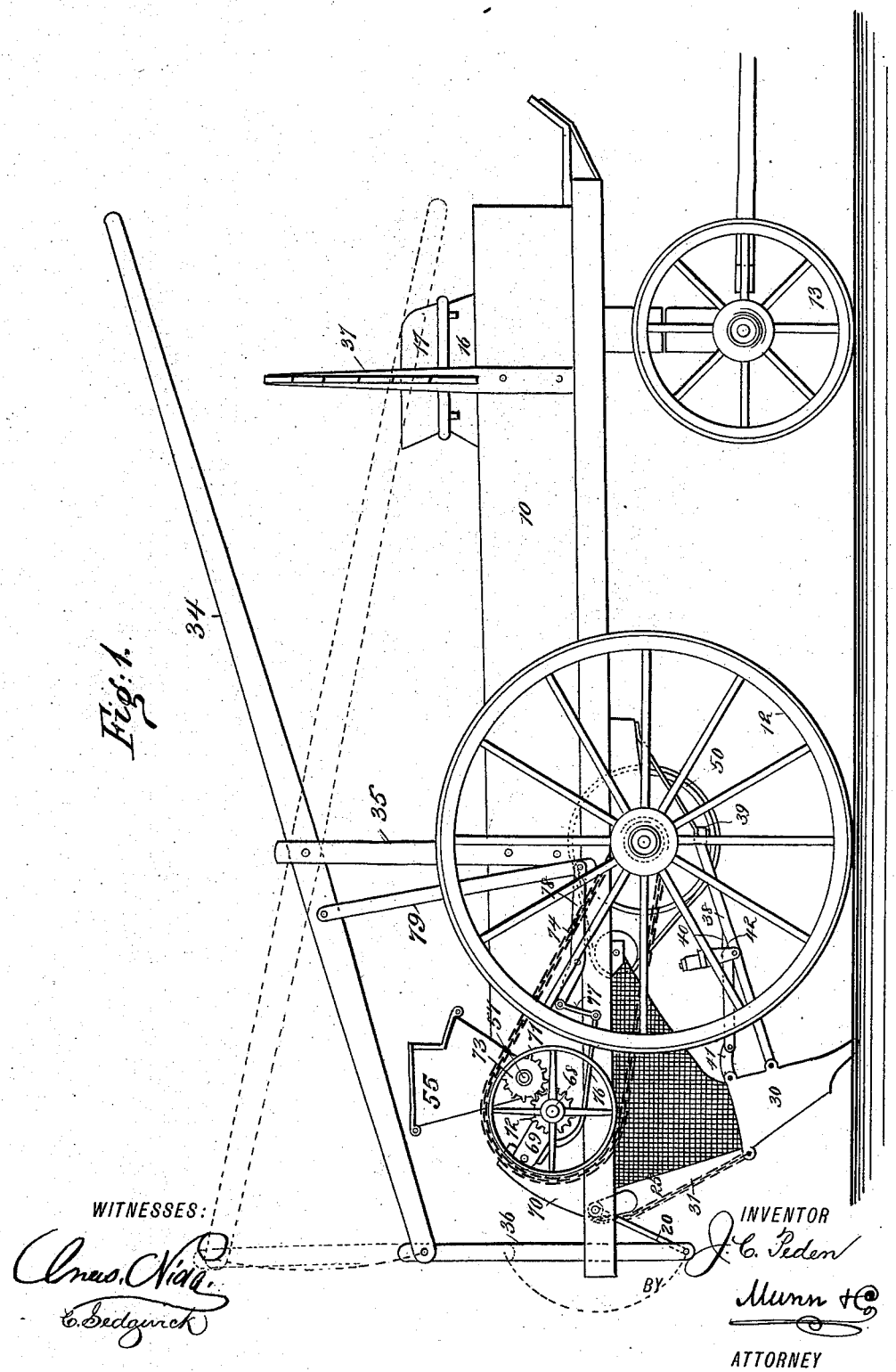
WITNESSES:
Chas. Nida
C. Sedgwick
INVENTOR
J. C. Peden
BY Munn & Co.
ATTORNEY (No Model.) 4 Sheets—Sheet 2.
J. C. PEDEN.
SEED DRILL AND FERTILIZER DISTRIBUTER.
No. 413,866. Patented Oct. 29, 1889.
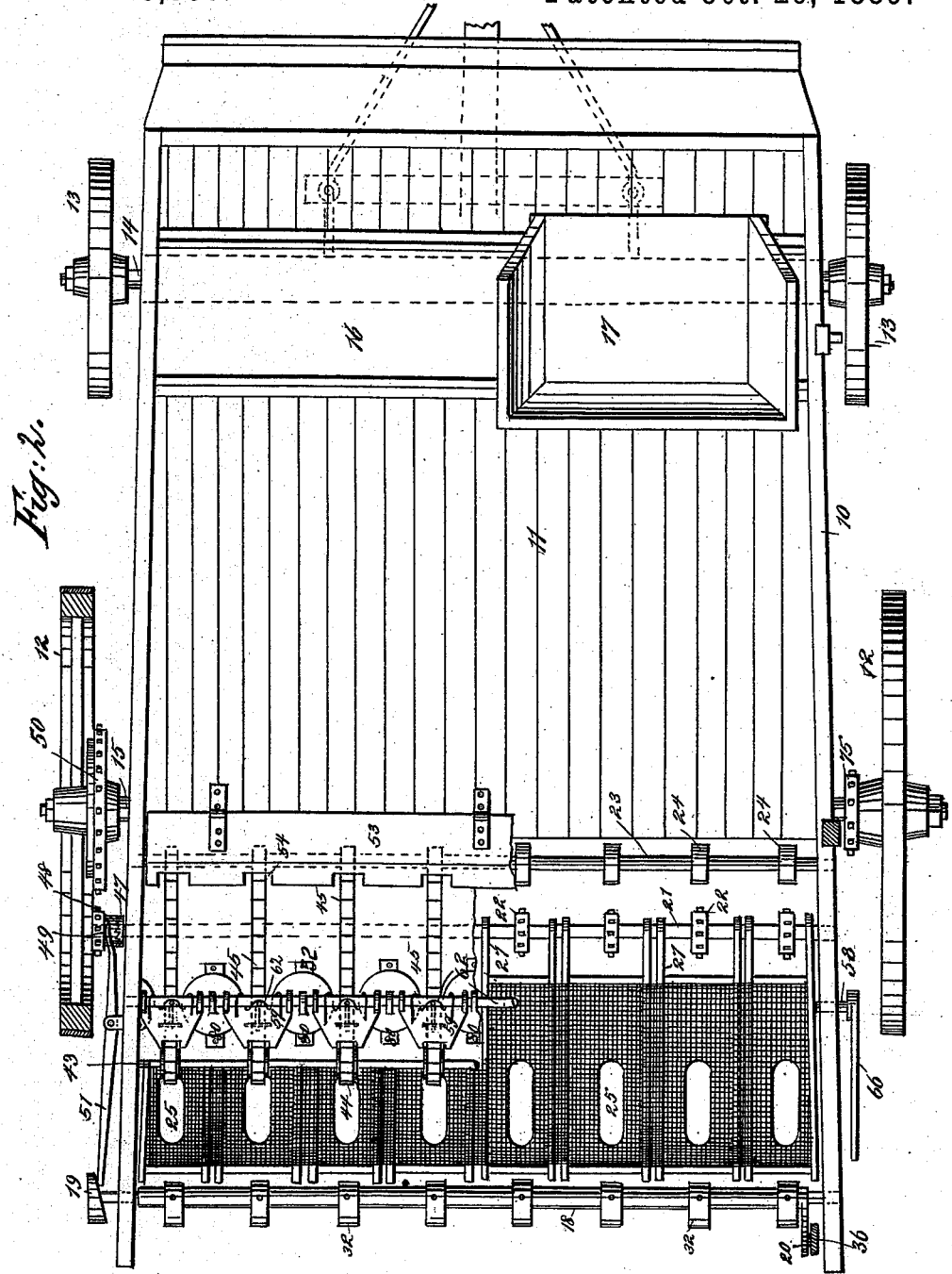
WITNESSES:
INVENTOR
J. C. Peden
BY Munn & Co.
ATTORNEY

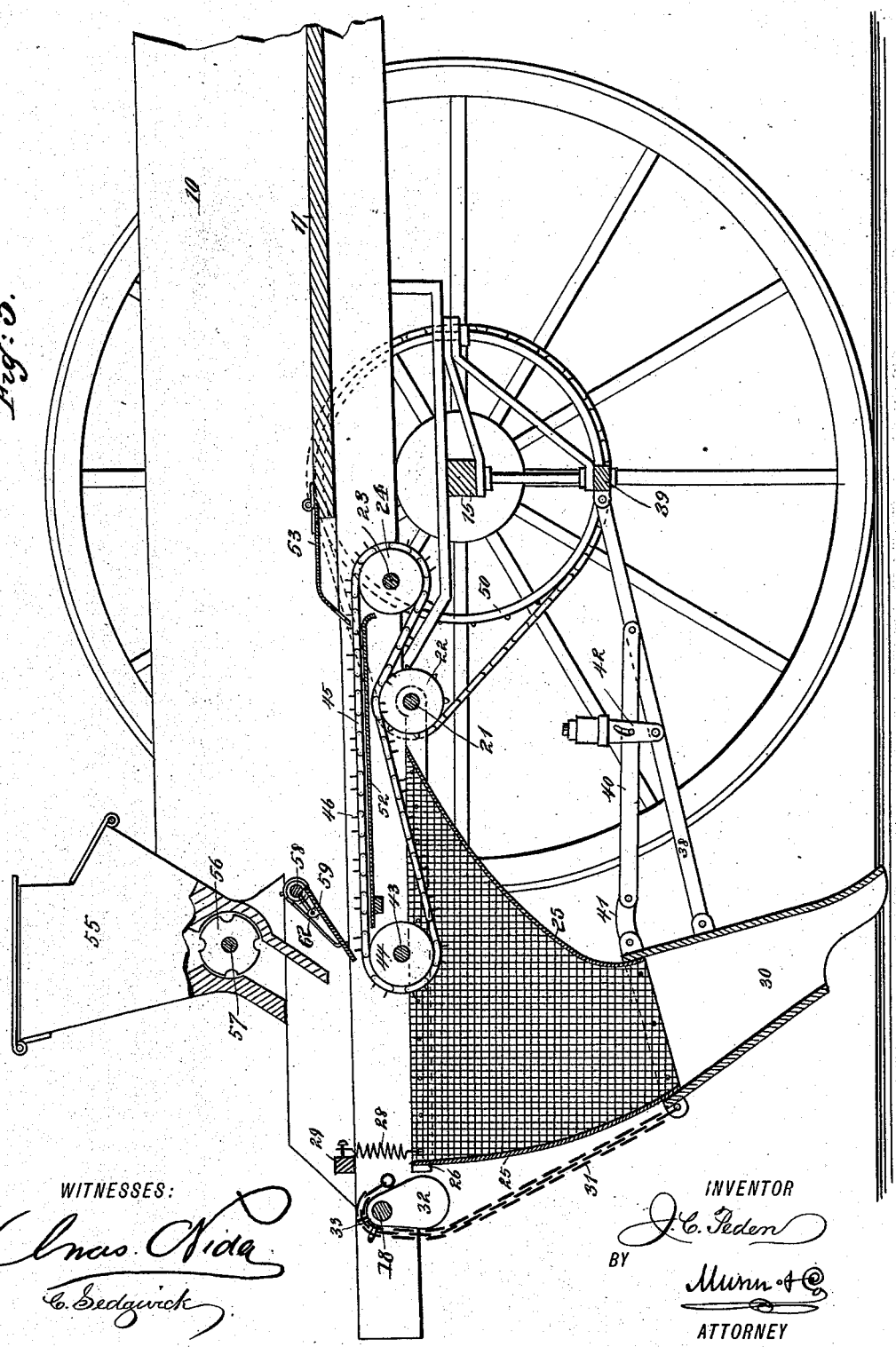

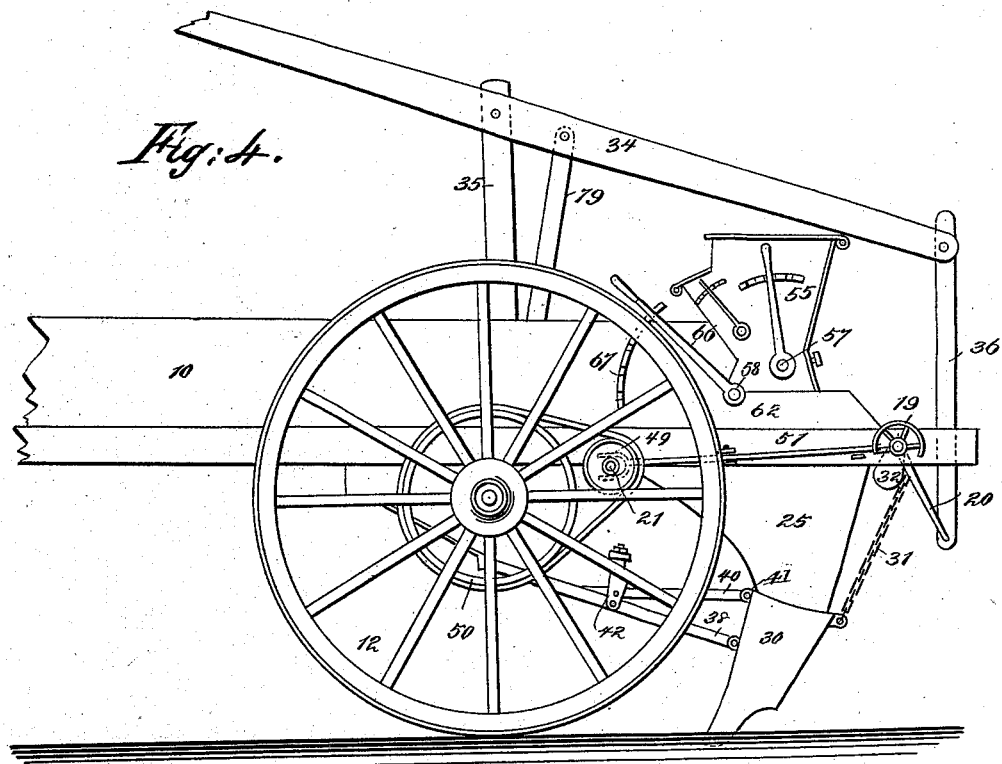

UNITED STATES PATENT OFFICE.

JONATHAN C. PEDEN, OF ROSE, MISSOURI.

SEED-DRILL AND FERTILIZER-DISTRIBUTER.

SPECIFICATION forming part of Letters Patent No. 413,866, dated October 29, 1889.

Application filed May 22, 1889. Serial No. 311,703. (No model.)

*To all whom it may concern:*

Be it known that I, JONATHAN C. PEDEN, of Rose, in the county of St. Clair and State of Missouri, have invented a new and useful Improvement in Wheat-Drills and Fertilizer-Distributers, of which the following is a full, clear, and exact description.

My invention relates to an improvement in wheat-drills having combined therewith fertilizer distributers so arranged that the fertilizer will be delivered to the hoes together with the cereal.

The object of the invention is to construct such a machine in a simple and durable manner and to provide a means whereby, when the hoes are elevated from the ground, the supply of seed and the fertilizer will be simultaneously cut off.

The invention consists of the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1 is an elevation of the right-hand side of the machine. Fig. 2 is a plan view, partially in section, and with the seed-boxes removed. Fig. 3 is a central vertical section through the machine. Fig. 4 is an elevation of a portion of the left-hand side of the machine, and Fig. 5 is a detail view of the gates and partitions dividing the same.

In carrying out the invention the body 10 of the vehicle is provided with a bottom 11, extending, however, only as far as the rear axle, as best shown in Figs. 2 and 3. The said body is carried by two front and two rear wheels 12 and 13, mounted, respectively, upon forward and rear axles 14 and 15, the forward axle being so attached to the body that the forward wheels may be made to make what is known as a "square turn." At the front the body is also provided with a cross-bar 16, upon which the driver's seat 17 is held to slide. Thus the driver may change the position of the seat as occasion may demand.

In the rear of the vehicle-body, between the side pieces thereof, a rock-shaft 18 is journaled, provided at one extremity outside of the side of the body with a semicircular block 19, having an inner cam-face, as illustrated in Fig. 2, and near the other extremity of the rock-shaft, within the opposite side pieces of the vehicle-body, an arm 20 is rigidly secured. A second transverse shaft 21 is journaled in the side pieces of the vehicle-body between the rear end of the permanent floor or bottom 11 and the rock-shaft 18, and upon this latter shaft 21 a series of sprocket-wheels 22 are rigidly secured. A third transverse shaft 23 is also journaled in the side pieces of the vehicle-body between the sprocket-wheel shaft 21 and the rear end of the bottom of the body, preferably adjacent to the latter and slightly above the parallel shaft 21, as is best shown in Fig. 3. Upon the transverse shaft 23 a series of chain-pulleys 24 are journaled, which pulleys are in horizontal alignment with the sprocket-wheels 22 of the shaft 21.

A series of conductors 25 are provided for attachment to the body, which conductors are constructed of a single strip of canvas or similar material, or a number of strips sewed together or otherwise attached, which canvas is stretched over a series of spaced rods or bars 27, attached at one end to the sprocket-wheel shaft 21, and supported at the other end by a spiral spring 28, secured to a beam 29, fastened to the side pieces of the vehicle-body near the rear end of the same, the said side pieces at this point being reduced in height, as shown in Fig. 3.

The springs 28 are of sufficient strength to support the weight of the conductors, and yet not strong enough to prevent the hose, hereinafter described, from operating in connection with the conductors or from falling into the ground in low places—as, for instance, in crossing furrows. The supporting-rods 27 are illustrated as arranged in pairs, but a series of single rods may be used, if desired. The distance the rods 27 are apart determines the width of the conductors. The canvas strip is so manipulated as to form therein any number of conductors, which are widest at the top and provided, preferably, with a convex rear surface and a concave forward surface, as shown in Figs. 1 and 3. The upper end of the conductors is preferably rectangular, and their number is regulated by the width of the vehicle-body, eight being usually employed, as illustrated. The series of conductors are fastened only at the ends of the strip to the end bars 27, the plain canvas between the conductors proper being held to slide upon the intermediate supporting-bars 27. The sprocket-wheels 22 are so located upon the shaft 21 that one wheel will be between two of the supporting-bars, as shown in Fig. 2.

As the canvas in which the conductors are formed is only fastened at its ends and is free to slip over the supporting-rods, the distance between two conductors, should a number of the hoes drop in a depression or a hole or holes, the amount of slack in the length of the canvas will permit the hoes to act. Should one hoe drop, the canvas will slide over two supporting-rods only and draw upon the springs 28. The lower end of each conductor is inserted in the upper end of a hoe 30, of any suitable or approved construction, and each hoe at its top and rear side has attached thereto one end of a chain 31, each of which chains is carried upward over a cam-block 32, essentially pear shape in general contour and having flat side faces, which cam-blocks are secured to the rock-shaft 18, and after the said chain has been passed over the said cam-blocks they are preferably permitted to hang down therefrom, as best shown in Fig. 3, each chain being held in position upon its cam-block, usually through the medium of a pin or staple 33. Each chain preferably terminates in a ring, whereby the driver may readily lift any hoe to avoid loose weeds, trash, or other obstructions. The chains are of such length as to permit the hoes to play up and down, and also enable the operator, when manipulating the rock-shaft lever 34, to quickly lift all the hoes—as, for instance, in turning.

The hoes are elevated, when desired, through the medium of a lever 34, fulcrumed at or near its center upon a standard 35, which is attached perpendicularly to the right-hand side of the vehicle-body at a point near the rear axle, as illustrated in Fig. 1. The rear end of the lever 34 is connected with the crank-arm 20 of the rock-shaft 18 through the medium of a link or connecting rod 36. The forward end of the lever 34 is adapted for contact with a perpendicular rack 37, attached to the right-hand side of the body of the vehicle near the driver's seat. Thus, through the medium of the said lever 34 and rack 37, the hoes 30 may be elevated any desired distance from the ground.

In order to permit an upward movement of the hoes and also to steady the same when down, I employ a well-known construction. To the forward face of each hoe a rod or bar 38 is pivotally secured, having pivoted thereto an upwardly-extending yoke 42, which rod or bar 38 is connected to a rod 39, supported transversely beneath the vehicle-body, preferably below the rear axle 15, as shown in Fig. 3. A draw-bar 40 is pivoted to the connecting-rod 38 and passes through the yoke, and is attached thereto by a spring, usually of rubber, having a tendency to push the bar 40 downward. A knee 41 is pivoted to the rear end of the draw-bar and to the hoe, and is kept normally horizontal by the tension of the spring. Thus the hoes are normally held in contact with the ground. Should the hoes, however, strike a stump or other obstruction, the knee gives way, compressing the spring which is located upon the top of the yoke, by which means the hoes are brought to their normal position after passing the obstruction.

Parallel to and in horizontal alignment with the shaft 23, carrying the chain-pulleys 24, a shaft 43 is journaled in the side pieces of the body, extending, preferably, transversely across the several conductors at or near the center of the same, as shown in Figs. 2 and 3, which shaft 43 is provided with chain-pulleys 44, aligning the pulleys 24 upon the shaft 23. Each aligning pulley of the shafts 23 and 43 is adapted to carry an endless chain belt 45, provided with a series of upwardly-extending pins 46. Each chain belt 45 contacts with one of the sprocket-wheels 22 of the shaft 21, as shown in Fig. 3, which sprocket-wheels communicate motion to the said chain belts.

The sprocket-wheel shaft 21 extends through the left-hand-side pieces of the vehicle-frame, and is provided with a fixed clutch-section 47 and a sliding clutch-section 48, carrying a small sprocket-wheel 49, which sprocket-wheel 49 is adapted to be connected by a suitable chain belt with a larger sprocket-wheel 50, rigidly secured to the rear axle or to the hub of the left-hand wheel of the said axle. Thus the sprocket-wheel shaft 21 receives motion directly from the rear drive-wheels 12. A lever 51 is fulcrumed upon the left-hand-side piece of the said vehicle-body near its rear end, the forward extremity of which lever is forked to embrace the sliding clutch-section 48 and to contact with the small sprocket-wheel 49. The rear end of the lever 51 is adapted for contact with the cam-surface of the semicircular block 19, forming a portion of the rock-shaft 18. This connection between the rock-shaft and the sprocket-wheel shaft is so effected that when the said rock-shaft 18, through the medium of the lever 34, is manipulated to elevate the hoes 30 the cam-block 19, which is ordinarily made in the form of a mutilated wheel, will act upon the forked lever 51 and cause the said lever to disengage the sliding clutch-section 48 from the fixed clutch-section 47, and thereby stop the motion of the sprocket-wheel shaft 21 and the movement of the chain belts 45.

In order to prevent the fertilizer when thrown upon the traveling chain belts 45 from falling through the belts to the ground, a horizontal platform 52, usually made of sheet metal, is secured to the cross-bars passing between the side pieces of the vehicle-body in such manner that the upper span of the belt will travel over and be substantially in contact with the upper face of the said platform 52. The platform is usually of sufficient length to extend practically from the periphery of the pulleys upon the shaft 43 to the periphery of the pulleys upon the opposite shaft 23, as best shown in Fig. 3, and the forward end of the platform is ordinarily curved downward, to prevent the chain belt from contacting therewith as it is revolved. The line of the chain belts 45 is below the plane of the fixed bottom 11 of the vehicle, and an apron 53 is hinged to the said fixed bottom, which apron is curved downward at its rear end to contact with the platform 52, and is recessed at intervals, as shown at 54 in Fig. 2, to permit the passage of the chain.

A seed-box 55 is provided for each conductor 25, and is properly supported above the same, as illustrated in Figs. 1, 3, and 4, the legs of the said seed-boxes being made to incline rearward, as illustrated in Fig. 3, and the delivery-wheel 56, contained within each box, is fixed upon a common shaft 57, extending through from side to side of the vehicle, which shaft is rotated in a manner hereinafter described.

In front of the forward legs of the seed-boxes 55, and above and in advance of the shaft 43, a shaft 58 is journaled in the side pieces of the vehicle-body, upon which shaft a series of gates 59 are attached, one gate being provided for each conductor 25. The form of the gates is illustrated in detail in Fig. 5, in which it will be observed that they are essentially triangular in general contour and are hinged at one end to the shaft 58. The gates are held in a downwardly-inclined position (shown best in Fig. 3) through the medium of a spring-wire or equivalent material 62, coiled around the shaft and held in contact therewith at the center through the medium of a pin 63 or equivalent device. The ends of the spring-wire are passed over the upper face of the gate, down through apertures 64, produced therein, and up again through similar apertures, whereupon the extremities of the spring are clinched or forced downward, as illustrated at 65. From the shaft 58, at or near the center of the gate, a bar 60 is downwardly projected, contacting with the front face of the gate and having a head 61, giving it the appearance of the letter T. This T-bar serves to limit the forward movement of the gate. I do not, however, confine myself to the spring 62 or the T-bar, as other construction may be substituted. By reason of the independent spring action thus imparted to each gate should a cob or rock be passed over the chain belts with the fertilizer the end of the gate will rise sufficiently to permit such obstruction to pass and then fall to its normal position.

The gate-shaft 58 is manipulated through the medium of a lever 66, secured to the end projecting from the left-hand side of the vehicle-body, which lever engages with a suitable rack 67, as shown in Fig. 4.

It will be observed that, while each of the gates may be raised independently, by manipulating the lever 66 they may be collectively raised or lowered to regulate the amount of fertilizer to be delivered to the conductors.

The delivery-wheel shaft of the seed-boxes is driven in the following manner: A short shaft 68 is journaled in a block 69, pivoted to a standard 70, projected upward from the right-hand side of the machine, which shaft 68 carries a chain-wheel 71 and a gear-wheel 72. The said gear-wheel 72 is made to mesh with a similar gear 73, attached to the shaft 57, and the chain-wheel 71 is driven by a chain belt 74, passing over a chain or sprocket wheel 75, secured to the rear axle, as best illustrated in Fig. 2. The block 69, to which the short shaft 68 is secured, is supported by a spring-bar 76, connected by a link 77 with a rock-lever 78, fulcrumed upon the right-hand side of the vehicle-body, as shown in Fig. 1, the said rock-lever being united with the main lever 34 of the machine by a connecting-rod 79. This connection is so effective that when the lever 34 is depressed in order to elevate the hoes and check the movement of the fertilizer-carriers or chain belts the said lever 34 will act upon the rock-lever 78 and cause said rock-lever to press downward the journal-block 69, and thereby separate the two gears 72 and 73. When the lever 34 is restored to its normal position, the spring-bar 76 forces the two gears in contact again. Between the gates 59 a partition 80 is rigidly fixed to the platform 52, which partitions are preferably conical and provided at their upper ends with a recess to receive the gate-shafts 58. The partitions are made conical to suit the inclined edges of the gates.

In operation the fertilizer is shoveled from the fixed bottom 11 of the vehicle-body upon the endless belts, and the said belts carry the fertilizer into the conductors, from whence it drops down through the hoes together with the seed. The operator shoveling the fertilizer, owing to the position of the seed-boxes, is enabled to ascertain whether or not the seed is properly flowing therefrom. The platform 52 is preferably grooved near its rear end to facilitate the delivery of the fertilizer.

Having thus described my invention, I claim as new and desire to secure by Letters Patent—

1. The combination, with a vehicle-body provided with a partial bottom, a series of laterally-movable conductors suspended from the body, hoes contacting with said conductors, and a rock-shaft secured in the rear of the vehicle-body provided with cam-blocks, of a chain attached to each hoe and passing over one of the cam-blocks, a crank-arm secured to the said rock-shaft, a lever fulcrumed upon the body, a link connecting the crank-arm and lever, and means, substantially as shown and described, for locking the said lever, as and for the purpose specified.

2. The combination, with a vehicle-body provided with a partial bottom, a shaft journaled in the sides of the body, conductors pivoted at one end upon said shaft and suspended from the body at the opposite end by springs, a hoe contacting with each conductor, a rock-shaft journaled in the rear of the body and provided with a series of cam-blocks, and chains attached to the several hoes and passing over the said cam-blocks, of endless carrying-belts held to travel above the conductors, a platform supported beneath the said belts, a lever fulcrumed upon one side of the vehicle-body, a link-connection between the rock-shaft and lever, and means, substantially as shown and described, for locking the lever, as set forth.

3. The combination, with a vehicle-body provided with a partial bottom, a shaft journaled in the sides of the body, laterally-movable conductors pivoted at one end upon the said shaft and suspended from the body at the opposite end by springs, a hoe contacting with each conductor, a rock-shaft journaled in the rear of the body provided with a series of cam-blocks, and chains attached to the several hoes and passing over the said cam-blocks, of endless carrying-belts held to travel one over each conductor, a platform supported beneath the series of belts, a shaft journaled in the sides of the body above the said carrying-belts, gates secured to the said shaft above each chain, partitions between the gates, a lever fulcrumed upon one side of the vehicle-body, a connection between said lever and the rock-shaft, and means, substantially as shown and described, for actuating the carrying-belts, all combined for operation as set forth.

4. The combination, with a vehicle-body provided with a partial bottom, a shaft journaled in the sides of the body, conductors pivoted at one end upon the said shaft and suspended from the body at the opposite end by springs, a hoe contacting with each conductor, a rock-shaft journaled in the rear of the body and provided with a series of cams, and chains attached to the several hoes and conductors and passing over the said cam-blocks, of endless chain belts held to travel over each of the conductors, a platform passing beneath the several chain belts, a shaft journaled transversely in the body beneath the belts and carrying sprocket-wheels engaging with the said belts and at one end provided with a fixed clutch-section and a sliding clutch-section, a cam-wheel secured upon one end of the rock-shaft, a forked lever pivoted upon the vehicle-body and engaging the cam-wheel and the sliding clutch-section, a shaft carrying a series of spring-actuated gates, one gate located over each chain belt, partitions between the gates, a lever fulcrumed upon one side of the vehicle-body and connected with the rock-shaft, substantially as shown and described, whereby, when the said rock-shaft is manipulated, the sliding clutch-section will be also manipulated, as and for the purpose specified.

5. The combination, with a vehicle-body provided with a partial bottom, a shaft journaled in the sides of the body, conductors pivoted at one end upon the said shaft and suspended from the body at the opposite end by springs, a hoe contacting with each conductor, a rock-shaft journaled in the rear of the body provided with a series of cam-blocks, and chains attached to the several hoes and conductors and passing over the said cam-blocks, of a series of endless carrying-chains supported one over each conductor, a platform passing horizontally beneath the several carrying-belts, a shaft provided with sprocket-wheels engaging each of the said carrying-belts and having a fixed and a sliding clutch-section at one end, a cam-wheel secured to one extremity of the rock-shaft, a lever contacting with the cam-wheel and sliding clutch-section, a shaft carrying a series of spring-actuated gates, one gate located over each carrying-belt, partitions between said gates, a seed-box supported over each of the conductors and provided with a distributing-wheel secured upon a common shaft, an apron hinged to the fixed bottom of the vehicle-body and resting upon the platform located beneath the endless carrying-belts, a lever fulcrumed to one side of the vehicle-body, a link-connection between the said lever and rock-shaft, and a connection, substantially as shown and described, between the said lever and the shaft carrying the distributing-wheels of the seed-boxes, and means for actuating the carrying-belts and the seed-distributers from the axle of the vehicle-body, as and for the purpose specified.

JONATHAN C. PEDEN.

Witnesses:
JAMES M. PUGH,
NANNIE PUGH.